(12) United States Patent  
Fujii (10) Patent No.: US 11,338,721 B2  
(45) Date of Patent: May 24, 2022

(54) VEHICLE LIGHT FIXTURE

(71) Applicant: KOITO MANUFACTURING CO., LTD., Tokyo (JP)

(72) Inventor: Keisuke Fujii, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/758,153

(22) PCT Filed: Oct. 2, 2018

(86) PCT No.: PCT/JP2018/036917  
§ 371 (c)(1),  
(2) Date: Apr. 22, 2020

(87) PCT Pub. No.: WO2019/082615  
PCT Pub. Date: May 2, 2019

(65) Prior Publication Data  
US 2020/0282896 A1   Sep. 10, 2020

(30) Foreign Application Priority Data

Oct. 23, 2017 (JP) .............................. JP2017-204720  
Oct. 23, 2017 (JP) .............................. JP2017-204721  
(Continued)

(51) Int. Cl.  
*B60Q 1/00* (2006.01)  
*B62J 6/022* (2020.01)  
(Continued)

(52) U.S. Cl.  
CPC .............. *B60Q 1/0035* (2013.01); *B60Q 1/14* (2013.01); *B60Q 1/34* (2013.01); *B60R 11/00* (2013.01);  
(Continued)

(58) Field of Classification Search  
CPC .............. F21S 41/153; F21W 2107/17; F21W 2104/00; B62J 6/022; B62J 6/023;  
(Continued)

(56) References Cited

U.S. PATENT DOCUMENTS 8,405,498 B1 * 3/2013 Smith ..................... B60R 21/01  
340/463  
2005/0237758 A1   10/2005 Takeda et al.  
(Continued)

FOREIGN PATENT DOCUMENTS

CN       1676371 A    10/2005  
CN       1769127 A     5/2006  
(Continued)

OTHER PUBLICATIONS

International Search Report (PCT/ISA/210) dated Dec. 18, 2018 by the International Searching Authority in counterpart International Patent Application No. PCT/JP2018/036917.  
(Continued)

*Primary Examiner* — Alexander K Garlen  
*Assistant Examiner* — Eric T Eide  
(74) *Attorney, Agent, or Firm* — Sughrue Mion, PLLC (57) ABSTRACT

A vehicle lamp is provided on a vehicle capable of traveling around a corner by inclining a vehicle body in a turning direction. The vehicle lamp includes a headlamp mounted on a front portion of the vehicle, and a combination lamp disposed on a vehicle body cover in a region adjacent to the headlamp so as to be visible from the front of the vehicle. The combination lamp includes a plurality of light emitting segments. Depending on arrangement locations, the light emitting segments differ in at least one of the shape of, the size of, the color of, and a distance between the light emitting segments.

20 Claims, 8 Drawing Sheets

(30) Foreign Application Priority Data

Oct. 23, 2017 (JP) .............................. JP2017-204722
Oct. 23, 2017 (JP) .............................. JP2017-204723

(51) Int. Cl.
| | | |
|---|---|---|
| B60Q 1/14 | (2006.01) | |
| B60Q 1/34 | (2006.01) | |
| B62J 6/24 | (2020.01) | |
| B62J 6/26 | (2020.01) | |
| F21S 43/50 | (2018.01) | |
| B60R 11/00 | (2006.01) | |
| F21V 23/00 | (2015.01) | |
| B62J 6/055 | (2020.01) | |
| B62J 45/41 | (2020.01) | |
| B62J 6/023 | (2020.01) | |
| B62J 6/026 | (2020.01) | |
| F21W 107/17 | (2018.01) | |
| F21W 103/10 | (2018.01) | |
| F21W 103/20 | (2018.01) | |
| F21W 103/55 | (2018.01) | |
| F21W 104/00 | (2018.01) | |

(52) U.S. Cl.
CPC .............. *B62J 6/022* (2020.02); *B62J 6/023* (2020.02); *B62J 6/026* (2020.02); *B62J 6/055* (2020.02); *B62J 6/24* (2020.02); *B62J 6/26* (2020.02); *B62J 45/41* (2020.02); *F21S 43/50* (2018.01); *F21V 23/003* (2013.01); *B60Q 2300/32* (2013.01); *F21W 2103/10* (2018.01); *F21W 2103/20* (2018.01); *F21W 2103/55* (2018.01); *F21W 2104/00* (2018.01); *F21W 2107/17* (2018.01)

(58) Field of Classification Search
CPC ... B62J 6/024; B62J 6/025; B62J 6/026; B62J 6/027
See application file for complete search history.

(56) References Cited

U.S. PATENT DOCUMENTS

| | | | |
|---|---|---|---|
| 2006/0056191 A1 | 3/2006 | Uemura et al. | |
| 2010/0265057 A1 | 10/2010 | Yeh | |
| 2013/0241413 A1 | 9/2013 | Ooba et al. | |
| 2014/0146552 A1 | 5/2014 | Hui | |
| 2015/0081168 A1* | 3/2015 | McWithey | F21S 41/663 701/36 |
| 2016/0185409 A1* | 6/2016 | Iwamoto | B60Q 1/1423 362/467 |
| 2016/0194044 A1 | 7/2016 | Inoue et al. | |
| 2016/0221626 A1 | 8/2016 | Inoue et al. | |
| 2016/0229473 A1 | 8/2016 | Inoue et al. | |
| 2016/0236743 A1 | 8/2016 | Kheawhorm et al. | |
| 2017/0101147 A1 | 4/2017 | Hasegawa | |
| 2017/0182930 A1 | 6/2017 | Sakamoto et al. | |
| 2018/0029641 A1* | 2/2018 | Solar | G06T 7/90 |
| 2020/0282896 A1 | 9/2020 | Fujii | |

FOREIGN PATENT DOCUMENTS

| | | | |
|---|---|---|---|
| CN | 1772555 A | 5/2006 | |
| CN | 1935584 A | 3/2007 | |
| CN | 201808620 U | 4/2011 | |
| CN | 203005622 U | 6/2013 | |
| CN | 103448843 A | 12/2013 | |
| CN | 103661692 A | 3/2014 | |
| CN | 204775644 U | 11/2015 | |
| CN | 105270514 A | 1/2016 | |
| CN | 105593060 A | 5/2016 | |
| CN | 209540771 U | 10/2019 | |
| DE | 200 22 184 U1 | 10/2001 | |
| DE | 10 2005 052 179 A1 | 5/2007 | |
| DE | 20 2012 004 965 U1 | 8/2012 | |
| EP | 1 645 466 A | 4/2006 | |
| EP | 2 669 160 A1 | 12/2013 | |
| JP | 2007-103211 A | 4/2007 | |
| JP | 2009-205965 A | 9/2009 | |
| JP | 3161286 U | 7/2010 | |
| JP | 2012-218468 A | 11/2012 | |
| JP | 2013-224126 A | 10/2013 | |
| JP | 2017-74820 A | 4/2017 | |
| JP | 2017-100500 A | 6/2017 | |
| WO | 2015/190113 A1 | 12/2015 | |
| WO | 2017/023293 A1 | 2/2017 | |
| WO | 2017/051558 A1 | 3/2017 | |

OTHER PUBLICATIONS

Written Opinion (PCT/ISA/237) dated Dec. 18, 2018 by the International Searching Authority in counterpart International Patent Application No. PCT/JP2018/036917.

Communication dated Apr. 6, 2021 issued by the Intellectual Property Office of the P.R.China in English application No. 201811238439.2.

Communication dated Sep. 7, 2021, from The China National Intellectual Property Administration in Application No. 201811238439. 2.

* cited by examiner

VEHICLE LIGHT FIXTURE

TECHNICAL FIELD

The present invention relates to a vehicle lamp.

BACKGROUND ART

A headlamp for a two-wheeled vehicle is known in Patent Literature I and the like.

PRIOR ART DOCUMENT

Patent Document

Patent Literature 1: JP-A2017-100500

SUMMARY OF INVENTION

Problem to be Solved

A size of the headlamp (particularly, a light source) mounted on an automobile, for example, a motorcycle in Patent Literature 1 tends to be reduced in accordance with technological progress and a request of a user. Therefore, the visibility of the motorcycle from another vehicle (such as a preceding vehicle or an oncoming vehicle) or a pedestrian when the headlamp is turned on may be lowered.

An object of the present invention is to provide a vehicle lamp capable of enhancing the visibility of a vehicle.

Means for Solving the Problem

In order to achieve the above object, in the present invention, a vehicle lamp provided in a vehicle capable of traveling around a corner by inclining a vehicle body in a turning direction includes:

a headlamp mounted on a front portion of the vehicle; and a combination lamp disposed on a vehicle body cover in a region adjacent to the headlamp so as to be visible from a front of the vehicle, in which the combination lamp includes a plurality of light emitting segments, and the plurality of light emitting segments differ in at least one of a shape of, a size of, a color of, and a distance between the light emitting segments depending on arrangement locations.

According to the vehicle lamp of the present disclosure, the visibility of vehicle can be enhanced. In particular, by turning on the combination lamp of which the light emitting segments having different modes depending on the arrangement locations, another vehicle or a pedestrian can easily recognize a direction of the own vehicle.

Further, in the vehicle lamp of the present invention, the combination lamp may include a first light emitting region provided on a vehicle side surface side and a second light emitting region provided on a vehicle front surface side, and at least one of a shape of, a size of, a color of, and a distance between light emitting segments of a plurality of light emitting segments constituting the first light emitting region may be different from that of a plurality of light emitting segments constituting the second light emitting region.

According to this configuration, the other vehicle or the pedestrian can more easily recognize the direction of the own vehicle.

Further, in the vehicle lamp of the present invention, the size of the plurality of light emitting segments in the second light emitting region may be configured to be larger than the size of the plurality of light emitting segments in the first light emitting region.

The distance between the plurality of light emitting segments in the second light emitting region may be configured to be shorter than the distance between the plurality of light emitting segments in the first light emitting region.

According to these configurations, the other vehicle or the pedestrian can more easily recognize the direction of the own vehicle, and a design property of the combination lamp can be improved.

Further, in the vehicle lamp of the present invention, the plurality of light emitting segments in the second light emitting region may be configured such that the size of light emitting segments on a central side is larger than the size of light emitting segments on both end sides.

According to this configuration, for example, even if the vehicle body cover has a planar shape, the vehicle body cover can appear to have a curved surface shape, and the design property can be improved.

Further, in the vehicle lamp of the present invention, the plurality of light emitting segments in the second light emitting region may be configured such that a distance between the light emitting segments on the central side is shorter than a distance between the light emitting segments on the both end sides.

Further, in the vehicle lamp of the present invention, the plurality of light emitting segments in the first light emitting region may be configured such that the size of light emitting segments on a vehicle front side is larger than the size of light emitting segments on a vehicle rear side.

Further, in the vehicle lamp of the present invention, the plurality of light emitting segments in the first light emitting region may be configured such that a distance between the light emitting segments on the vehicle front side is shorter than a distance between the light emitting segments on the vehicle rear side.

According to these configurations, the other vehicle or the pedestrian can more easily recognize the direction of the own vehicle, and the design property of the combination lamp can be improved.

According to this configuration, the novel vehicle lamp having the high design property can be provided.

In order to achieve the above object, in the present invention, a vehicle lamp provided in a vehicle capable of traveling around a corner by inclining a vehicle body in a turning direction includes:

a headlamp mounted on a front portion of the vehicle; and a combination lamp disposed on a vehicle body cover in a region adjacent to the headlamp so as to be visible from a front of the vehicle, in which the combination lamp includes a first light emitting region and a second light emitting region disposed at a position different from the first light emitting region, and a non-light emitting region is provided between the first light emitting region and the second light emitting region.

According to the vehicle lamp of the present disclosure, the visibility of an own vehicle can be enhanced. In particular, by turning on the combination lamp provided in the non-light emitting region, another vehicle or a pedestrian can easily recognize a direction of the own vehicle.

Further, in the vehicle lamp of the present invention, the vehicle body cover may include a bent portion between the second light emitting region and the non-light emitting region.

According to this configuration, the other vehicle or the pedestrian can more easily recognize the direction of the own vehicle.

Further, in the vehicle lamp of the present invention, at least a part of the first light emitting region may be disposed on a side surface side of the vehicle, and at least a part of the second light emitting region may be disposed on a front surface side of the vehicle.

According to this configuration, the other vehicle or the pedestrian can more easily recognize the direction of the own vehicle.

Further, in the vehicle lamp of the present invention, the first light emitting region may be formed to extend in an upper-lower direction on both sides of a front wheel of the vehicle, and the second light emitting region may be disposed above the front wheel.

According to this configuration, the light emitting unit including the first light emitting region, the second light emitting region, and the non-light emitting region is formed in a vertically long downward U-shape when viewed from the front of the vehicle. Accordingly, the other vehicle and the pedestrian can easily recognize that the vehicle on which the vehicle lamp is mounted is, for example, a motorcycle, and recognize the direction of the vehicle.

Further, the vehicle lamp of the present invention may further include:

an illumination control unit configured to change an illumination state of the combination lamp according to a traveling state of the vehicle, in which the first light emitting region and the second light emitting region each may have a plurality of light emitting segments, and the illumination control unit may be configured to change an illumination state of each of the plurality of light emitting segments.

According to this configuration, the visibility of the vehicle (particularly the direction of the vehicle) can be further enhanced by changing a light emission pattern of the plurality of light emitting segments in various manners.

Further, in vehicle lamp of the present invention, the first light emitting region may function as a turn signal lamp, a daytime running lamp, a clearance lamp, or a decorative lamp which emits decorative light, and the second light emitting region may function as the decorative lamp.

According to this configuration, the novel combination lamp having the high design property can be provided.

In order to achieve the above object, in the present invention, a vehicle lamp provided in a vehicle capable of traveling around a corner by inclining a vehicle body in a turning direction includes:

a headlamp mounted on a from portion of the vehicle; and a combination lamp disposed on a vehicle body cover in a region adjacent to the headlamp so as to be visible from a front of the vehicle, in which the combination lamp includes a first light emitting region, and the first light emitting region is formed such that at least a part thereof extends in an upper-lower direction on both sides of a front wheel of the vehicle.

According to the vehicle lamp of the present disclosure, the visibility of an own vehicle can be enhanced. In particular, since the first light emitting region is formed as two vertically long lines when viewed from the front of the vehicle, by turning on the combination lamp, another vehicle or a pedestrian can easily recognize that the own vehicle is, for example, a motorcycle.

Further, in the vehicle lamp of the present invention, the combination lamp may further include a second light emitting region, the first light emitting region may be disposed on two side surface sides of the vehicle, and the second light emitting region may be disposed on a front surface side of the vehicle and above the front wheel.

According to this configuration, the light emitting unit including the first light emitting region and the second light emitting region is formed in a vertically long downward U-shape when viewed from the from of the vehicle. Accordingly, the other vehicle and the pedestrian can easily recognize that the own vehicle is a motorcycle.

Further, in the vehicle lamp of the present invention, a non-light emitting region may be provided between the first light emitting region and the second light emitting region.

According to this configuration, by turning on the combination lamp provided in the non-light emitting region, the other vehicle or the pedestrian can easily recognize a direction of the own vehicle.

Further, in the vehicle lamp of the present invention, the first light emitting region may include a third light emitting region, and a fourth light emitting region disposed on a vehicle rear side than the third light emitting region, and the third light emitting region and the fourth light emitting region may be capable of emitting light of different colors.

According to this configuration, by making light colors emitted from the third light emitting region and the fourth light emitting region different, various functions as the combination lamp can be exhibited.

Further, the vehicle lamp of the present invention may further include:

an illumination control unit configured to change an illumination state of the combination lamp according to a traveling state of the vehicle, in which the second light emitting region and the fourth light emitting region each may have a plurality of light emitting segments, and the illumination control unit may be configured to change an illumination state of each of the plurality of light emitting segments.

According to this configuration, the visibility can be further enhanced by changing the light emission pattern of the plurality of light emitting segments in various manners.

Further, in the vehicle lamp of the present invention, the third light emitting region may function as a turn signal lamp, a daytime running lamp, or a clearance lamp, the fourth light emitting region may function as a turn signal lamp of a decorative lamp which emits decorative light, and the second light emitting region may function as the decorative lamp.

According to this configuration, the novel combination lamp having the high design property can be provided.

Further, in order to achieve the above object, in the present invention, a vehicle lamp provided in a vehicle capable of traveling around a corner by inclining a vehicle body in a turning direction includes:

a headlamp mounted on a front portion of the vehicle;

a combination lamp disposed on a vehicle body cover in a region adjacent to the headlamp so as to be visible from a front of the vehicle;

an environmental information acquisition unit configured to acquire environmental information outside the vehicle; and an illumination control unit configured to change an illumination state of the combination lamp according to the acquired environmental information.

According to the vehicle lamp of the present disclosure, the visibility of an own vehicle can be enhanced. In particular, it is possible to effectively notify surroundings of the presence of the own vehicle by changing the illumination state of the combination lamp according to the environmental information.

Further, in the vehicle lamp of the present invention, the environmental information may include information on at least one of a distance between the vehicle and an object, a density of the object, and a road condition.

According to this configuration, for example, when there are many other vehicles or pedestrians around the own vehicle, or when the own vehicle approaches a place with many blind spots (such as an intersection), the surroundings can be notified of the presence of the own vehicle by changing the illumination state of the combination lamp.

Further, in the vehicle lamp of the present invention, the illumination control unit may be configured to switch between turning on and off the combination lamp or change a light emission pattern of the combination lamp according to the environmental information.

According to this configuration, the visibility of the own vehicle can be further enhanced by changing a mode for making a notification of the presence of the own vehicle according to the environmental information.

Further, in the vehicle lamp of the present invention, the environmental information acquisition unit may include a sensor mounted on the vehicle, and the sensor may be at least one of LIDAR, a camera, and a radar.

In order to accurately detect environmental information outside the vehicle, it is preferable to use these as the sensor.

Further, in the vehicle lamp of the present invention, the environmental information acquisition unit may acquire the environmental information using road-to-vehicle communication with a base station device or inter-vehicle communication with an onboard device of a vehicle different from the vehicle.

By using the road-to-vehicle communication or the inter-vehicle communication, various kinds of environmental information can be acquired.

Further, the vehicle lamp of the present invention may further include:

a road surface drawing lamp capable of forming a road surface drawing pattern on a road surface, in which the illumination control unit may be configured to adjust an illumination state of the road surface drawing pattern according to the environmental information.

According to this configuration, the visibility of the own vehicle can be further enhanced by using the road surface drawing pattern.

Effects

According to the present invention, the vehicle lamp capable of enhancing the visibility of the vehicle can be provided.

DETAILED DESCRIPTION OF EMBODIMENTS

Embodiments of the present invention will be described with reference to the drawings. In the present embodiment, a "left-right direction", a "front-rear direction" and an "upper-lower direction" are relative directions set for a vehicle shown in FIG. 1 for convenience of description. The "front-rear direction" includes a "from direction" and a "rear direction", The "left-right direction" includes a "left direction" and a "right direction". The "upper-lower direction" includes an "upper direction" and a "lower direction".

Figure 1:
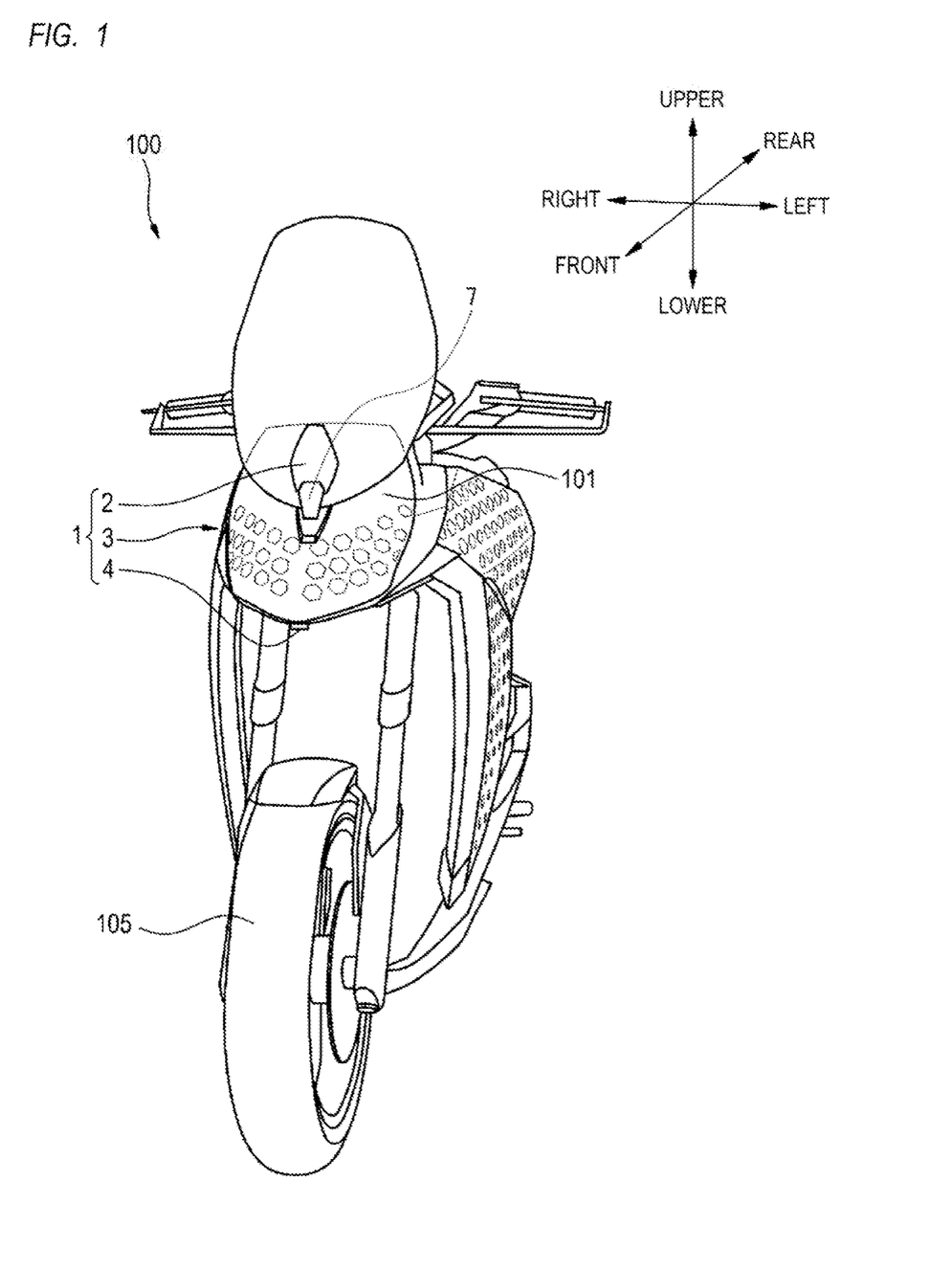
FIG. 1 is a partially enlarged perspective view of a vehicle including a vehicle lamp according to an embodiment of the present invention.

FIG. 1 is a partially enlarged perspective view of a motorcycle 100 (an example of the vehicle) provided with a vehicle lamp 1 according to the present embodiment, and shows a front-side portion of the motorcycle 100. The motorcycle 100 is a vehicle capable of traveling around a corner (a curve) of a road by inclining a vehicle body in a turning direction. The vehicle of the present embodiment may be any vehicle capable of traveling around a corner by inclining the vehicle body in the turning direction, such as the motorcycle 100, and the number of wheels is not limited. Therefore, for example, a motor tricycle or a motor four-wheeled vehicle is included in the vehicle of the present embodiment as long as the vehicle is capable of traveling in a similar manner as the motorcycle 100.

Figure 2:
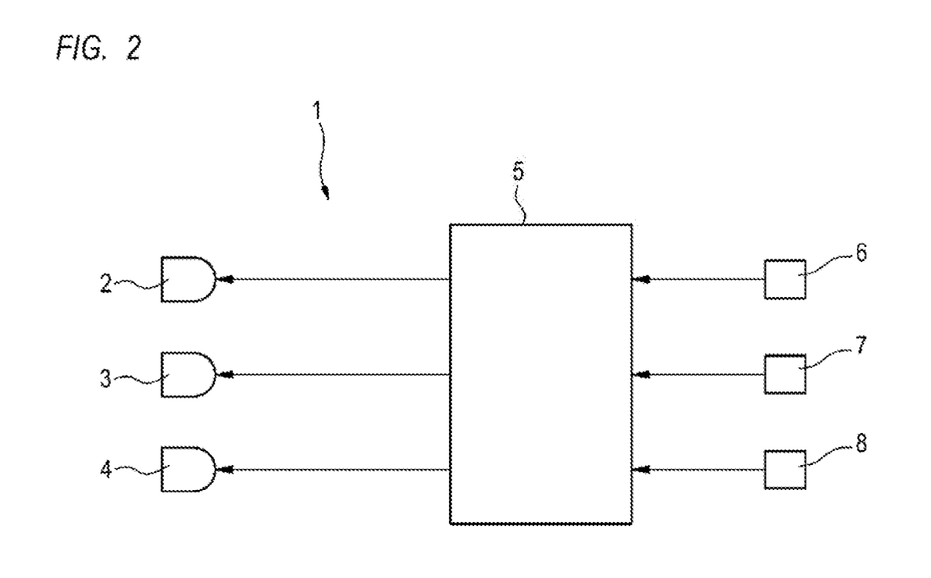
FIG. 2 is a block diagram of the vehicle lamp in FIG. 1.

As shown in FIGS. 1 and 2, the vehicle lamp 1 according to the present embodiment is mounted on the motorcycle 100, for example, on a front portion of the vehicle body. The vehicle lamp 1 includes a headlamp 2 capable of irradiating the front the vehicle, a combination lamp 3 visible from the front of the vehicle, and a road surface drawing lamp 4 capable of forming a drawing pattern on a road surface. Although the motorcycle 100 including one headlamp 2 is illustrated in the present embodiment, the motorcycle 100 may be, for example, a motorcycle including one headlamp on each of left and right sides. The headlamp 2 is disposed at an upper center of a cowl (an example of a vehicle body cover) 101 constituting at least a part of the vehicle body on the front side of the motorcycle 100, and the combination lamp 3 is disposed below the headlamp 2 and on both side surface portions of the cowl 101. The combination lamp 3 is not limited to the one disposed on the cowl 101, and may be disposed in a region adjacent to the headlamp 2 and at a position easily visible from around the motorcycle 100. The road surface drawing lamp 4 is preferably disposed at a position which is not easily visible from around the motorcycle 100. In this example, the road surface drawing lamp 4 is disposed, for example, at a lower end of a front-side portion of the cowl 101 as shown in FIG. 1.

The headlamp 2 includes a light source (not shown) for emitting light which illuminates a predetermined region in front of the motorcycle 100. A lamp light source or a light emitting element can be used as the light source. Examples of the lamp light source include an incandescent lamp, a halogen lamp, a discharge lamp, a neon lamp and the like. Examples of the light emitting element include a light emitting diode, a laser diode, an organic EL element and the like.

As described later, the combination lamp 3 has a function as, for example, a turn signal lamp, a clearance lamp and a daytime running lamp. Further, the combination lamp 3 also functions as a decorative lamp for increasing the visibility from surroundings and transmitting the presence and a traveling direction of the motorcycle 100 to another vehicle or a pedestrian. Therefore, preferably, the communication lamp 3 does not function as a headlight as the headlamp 2, and emits light at a light intensity which does not give glare total the pedestrian or a driver of the other vehicle.

Figure 8:
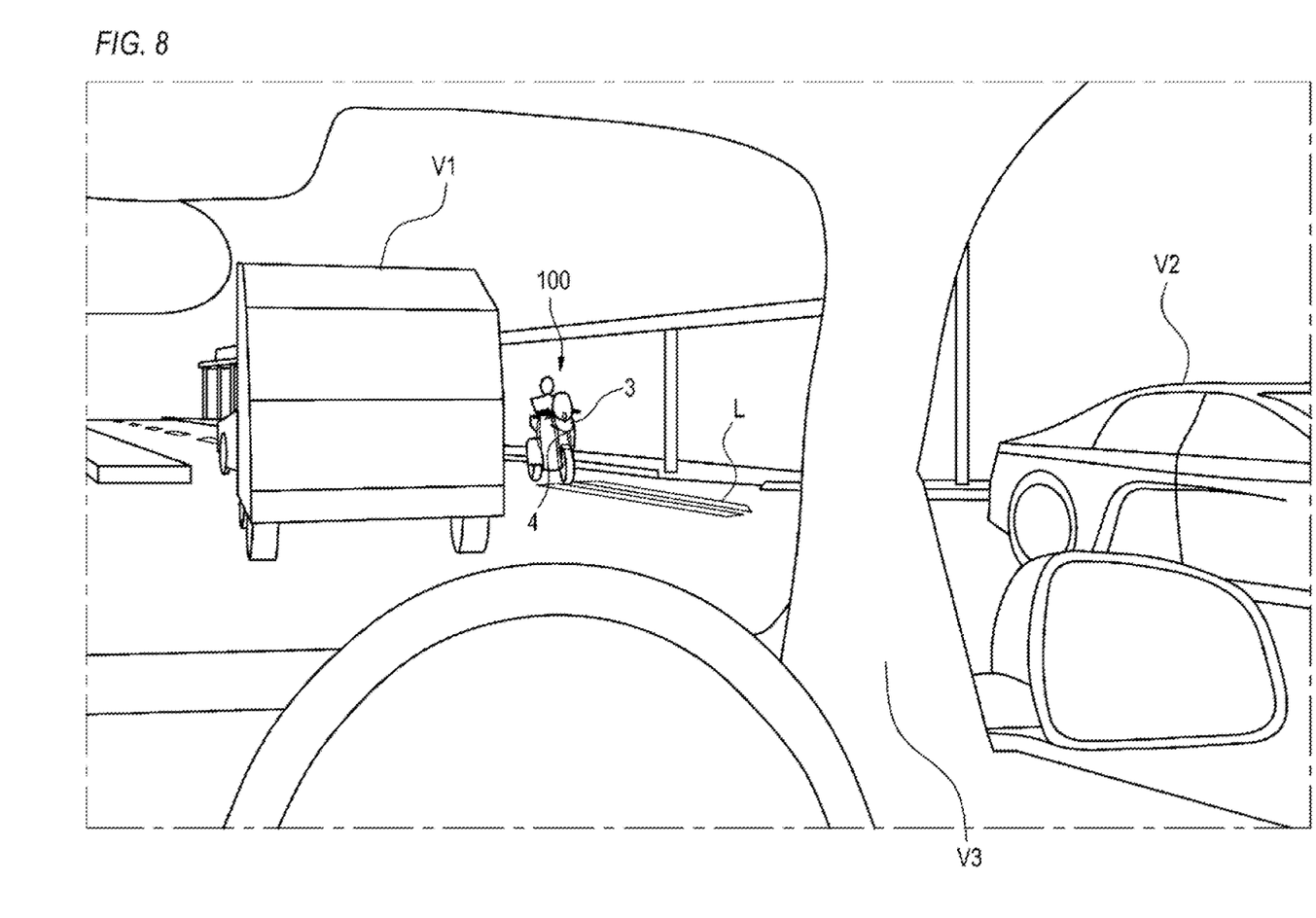
FIG. 8 is a schematic diagram showing an example of the lighting control of the combination lamp and the road surface drawing lamp.

The road surface drawing lamp 4 has a configuration for projecting (emitting) a predetermined drawing pattern on a road surface in front of the motorcycle 100. The road surface drawing lamp 4 may be, for example, a projector. For example, as shown in FIG. 8, the road surface drawing lamp 4 can form a drawing pattern as two parallel guide lines L on the road surface in front of the motorcycle 100.

As shown in FIG. 2, the vehicle lamp 1 includes an illumination control unit 5 which controls operations of the headlamp 2, the combination lamp 3, and the road surface drawing lamp 4. The headlamp 2, the combination lamp 3 and the road surface drawing lamp 4 are connected to the illumination control unit 5. In addition, a bank angle sensor 6 which detects an inclination state (a bank angle) of the motorcycle 100 and an external sensor 7 which detects environmental information outside the vehicle are connected to the illumination control unit 5. Further, a speed sensor 8 and the like which detects a speed of the motorcycle 100 is connected to the illumination control unit 5. The illumination control unit 5, the bank angle sensor 6, the external sensor 7 (an example of an environmental information acquisition unit) and the speed sensor 8 may be provided in a lamp chamber of the headlamp 2 (or the road surface drawing lamp 4), or may be mounted on predetermined positions of the vehicle body of the motorcycle 100 outside the headlamp 2 and the like. The illumination control unit 5 may be implemented as a function of an integrated control unit (ECU) mounted on the motorcycle 100, or may be implemented as a function of a control device disposed in the lamp chamber of the headlamp 2 or the road surface drawing lamp 4.

The illumination control unit 5 includes, for example, at least one electronic control unit (ECU). The electronic control unit may include at least one microcontroller including one or more processors and one or more memories, and other electronic circuits including an active element such as a transistor and a passive element. The processor is, for example, a central processing unit (CPU), a micro processing unit (MPU), a graphics processing unit (GPU), and/or a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automated driving. The AI program is constructed by supervised or unsupervised machine learning, such as deep learning, using a neural network. The RAM may temporarily store the vehicle control program, vehicle control data, and/or surrounding environmental information indicating surrounding environment of the vehicle. The processor may be configured to load a program specified by the vehicle control program stored in a storage device or the ROM onto the RAM, and execute various kinds of processing in cooperation with the RAM.

The electronic control unit (ECU) may include an integrated circuit (hardware resource) such as an application specific integrated circuit (ASIC) or a field-programmable gate array (FPGA). The electronic control unit may include a combination of at least one microcontroller and the integrated circuit.

The bank angle sensor 6 is a sensor capable of detecting an inclination angle when the vehicle body of the motorcycle 100 is inclined left and right with respect to a vertical line. The bank angle sensor 6 includes, for example, a gyro sensor. The inclination angle of the vehicle body may be calculated based on an image captured by a camera mounted on the motorcycle 100.

The external sensor 7 is a sensor capable of acquiring environmental information outside the own vehicle 100 including surrounding environment of the motorcycle 100 (for example an obstacle, another vehicle (a preceding vehicle or an oncoming vehicle), a pedestrian, a road shape, a traffic sign and the like). The external sensor 7 includes at least one of, for example, light detection and ranging or laser imaging detection and ranging (LiDAR), a camera and a radar.

The information detected by the bank angle sensor 6, the external sensor 7 and the speed sensor 8 is transmitted to the illumination control unit 5. The illumination control unit 5 controls the operation of the headlamp 2, the combination lamp 3 and the road surface drawing lamp 4 based on the information transmitted from the sensors 6 to 8. For example, the illumination control unit 5 can control the headlamp 2 based on the information detected by the sensors 6 to 8 and adjust a light distribution pattern formed in front of the vehicle. For example, the illumination control unit 5 can control the combination lamp 3 based on the information detected by the sensors 6 to 8 and adjust a light emission pattern visible from around (particularly, the front side of) the motorcycle 100. The illumination control unit 5 can control the road surface drawing lamp 4 based on the information detected by the sensors 6 to 8 and adjust the road surface drawing pattern formed on the road surface in front of the motorcycle 100.

Figure 3:
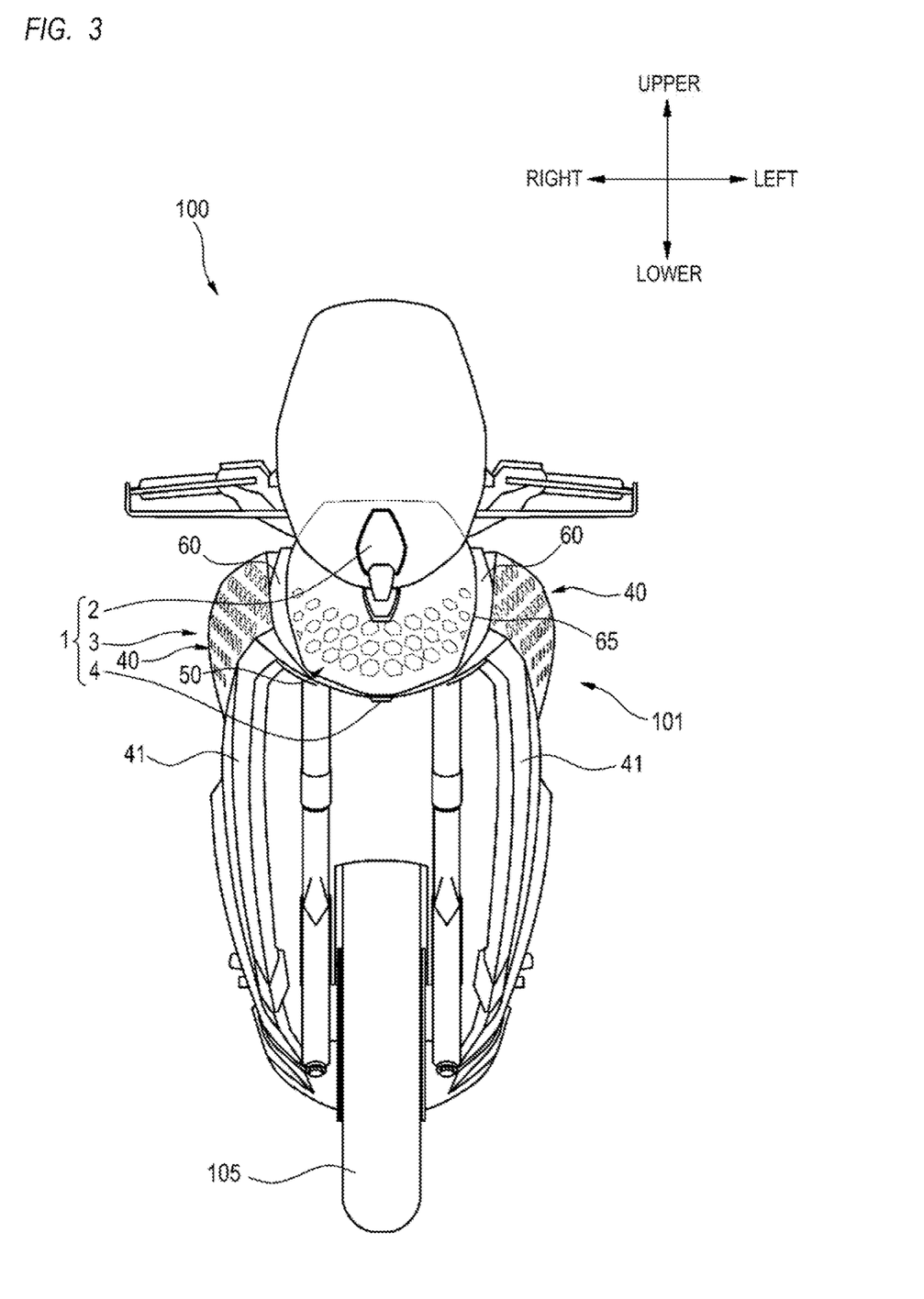
FIG. 3 is a front view of the vehicle in FIG. 1.
Figure 4:
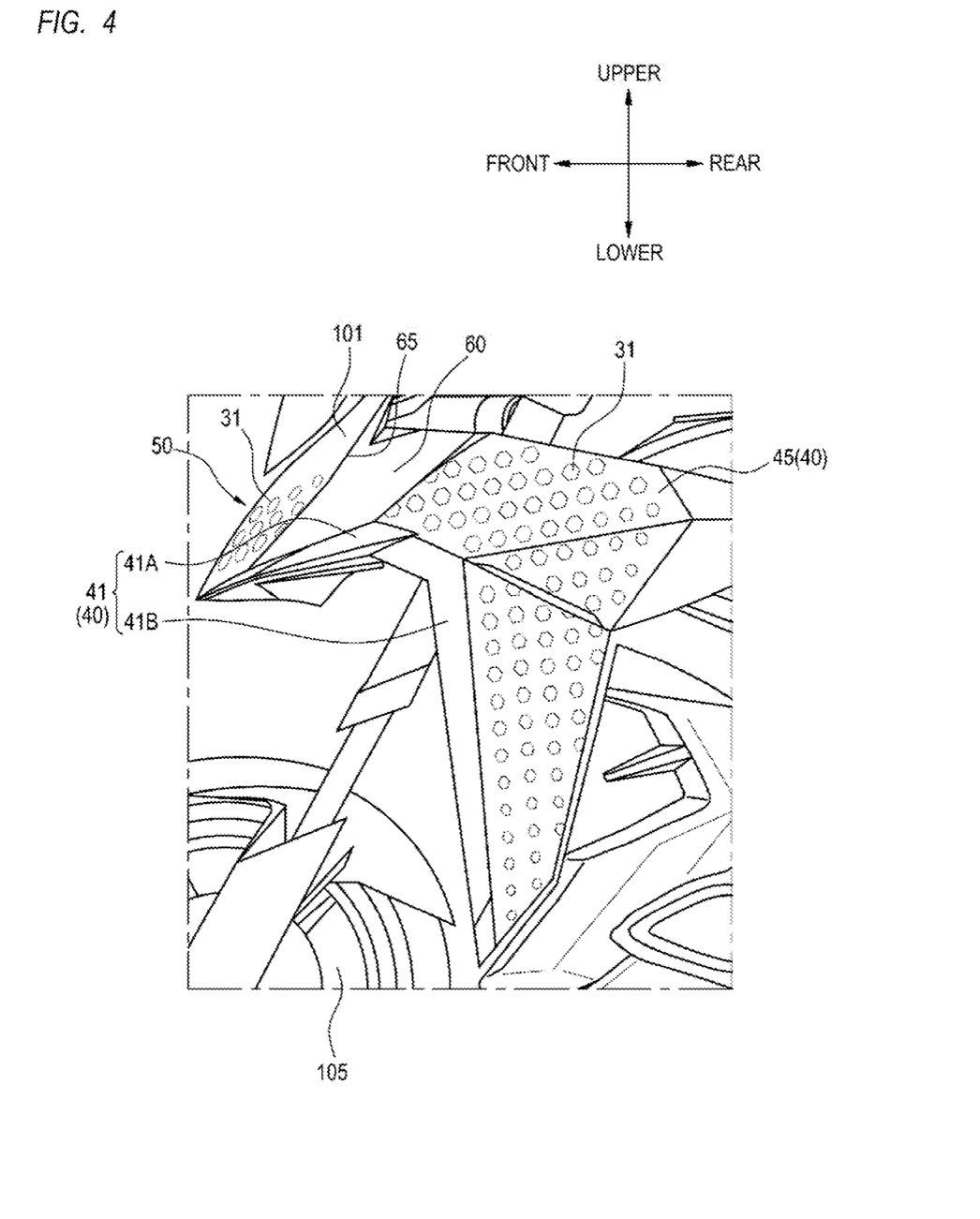
FIG. 4 is a partially enlarged side view of the vehicle in FIG. 1.
Figure 5:
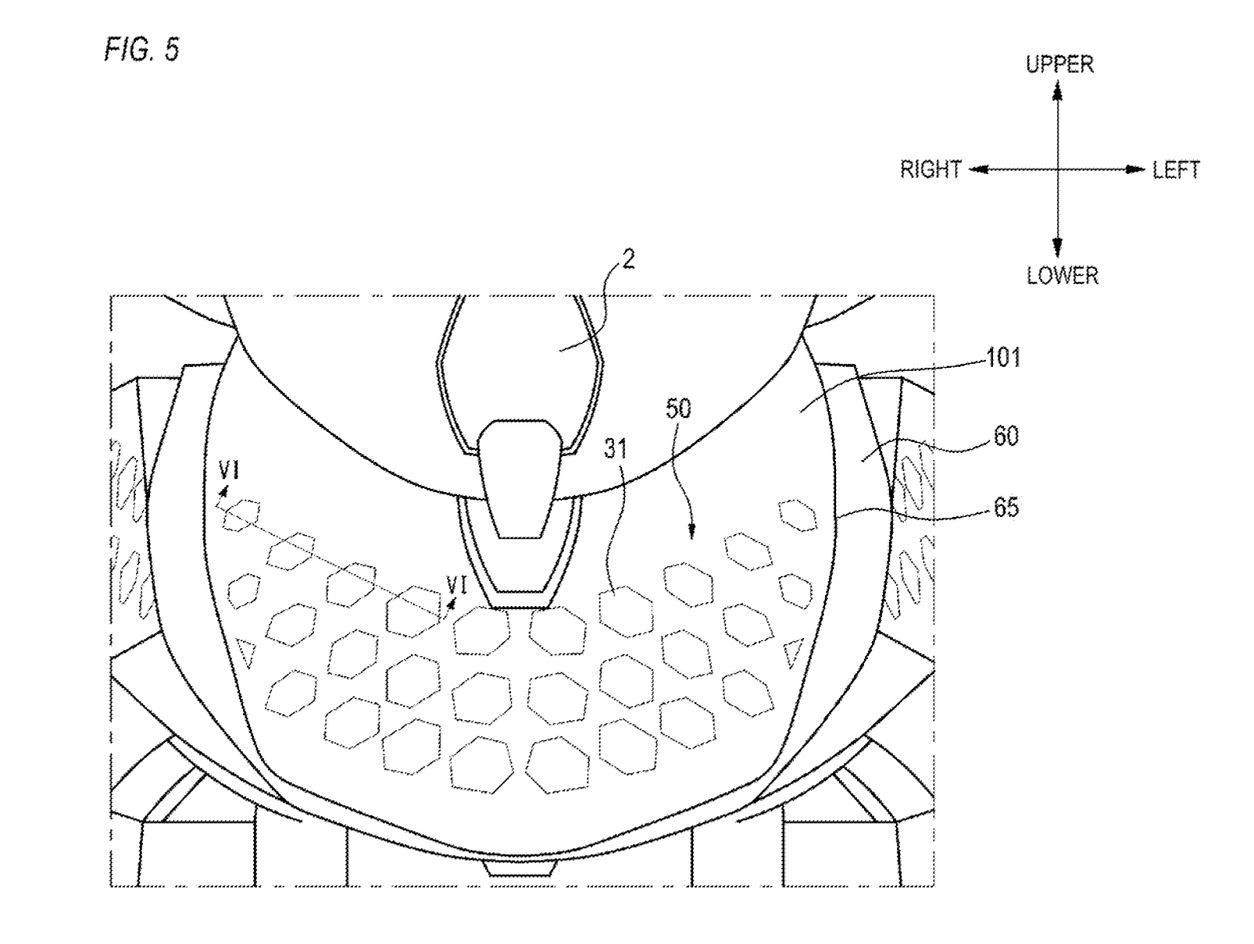
FIG. 5 is a partially enlarged front view of the vehicle in FIG. 1.

FIG. 3 is a front view of the motorcycle 100, FIG. 4 is a partially enlarged side view of the motorcycle 100, and FIG. 5 is a partially enlarged front view of the motorcycle 100.

As shown in FIGS. 3 to 5, the combination lamp 3 includes at least first light emitting regions 40 and a second light emitting region 50. The first light emitting regions 40 are formed on portions provided on both side surface sides of the motorcycle 100 in the cowl 101. The second light emitting region 50 is formed on a portion provided on a front surface side of the motorcycle 100 in the cowl 101.

The first light emitting region 40 includes a marker lamp region 41 and a decorative lamp region 45. The marker lamp region 41 is formed so as to extend in the upper-lower direction on both sides of the front wheel 105 of the motorcycle 100 when viewed from the front of the motorcycle 100 and to have a shape (substantially L-shaped) in which an upper end portion thereof is bent toward a vehicle front side. The marker lamp region 41 has a function as at least one of, for example, a turn signal lamp, a clearance lamp, and a daytime running lamp. Specifically, a substantially horizontal part (upper part) 41A of the marker lamp region 41 at an upper end can function as the clearance lamp or the daytime running lamp, and a part (lower part) 41B extending downward from the upper part 41A can function as the turn signal lamp or the clearance lamp.

Although not shown, the marker lamp region 41 includes, for example, a plurality of light sources light emitting elements and the like) arranged on a substrate and an outer cover formed so as to cover the plurality of light sources. In this example, the upper part 41A of the marker lamp region 41 is configured to emit, for example, white light, and the lower part 41B of the marker lamp region 41 is configured to emit, for example, amber (orange) light.

The decorative lamp region 45 is disposed to be continuous with the marker lamp region 41 on a vehicle rear side of the marker lamp region 41. The decorative lamp region 45 has a function as a decorative lamp for transmitting the presence or traveling direction of the motorcycle 100 to the other vehicle and the pedestrian in the surroundings. The decorative lamp region 45 may also function as the clearance lamp. The decorative lamp region 45 is configured such that a plurality of light emitting segments 31 described later emit, for example, white light.

The second light emitting region 50 is disposed above the front wheel 105 and below the headlamp 2. Similar to the decorative lamp region 45 of the first light emitting region 40, the second light emitting region 50 has a function as the decorative lamp for transmitting the presence or traveling direction of the motorcycle 100 to the other vehicle and the pedestrian in the surroundings. The second light emitting region 50 is configured such that the plurality of light emitting segments 31 described later emit, for example, white light.

As shown in FIGS. 3 to 5, a non-light emitting region 60 is provided between the first light emitting region 40 and the second light emitting region 50 of the cowl 101. The non-light emitting region 60 is a region where a light emitting portion such as the light emitting segments 31 described later is not provided. The non-light emitting region 60 is disposed, for example, above the marker lamp region 41 of the first light emitting region 40. A bent portion 65 is formed in the non-light emitting region 60, in particular, in the cowl 101 between the second light emitting region 50 and the non-light emitting region 60. That is, the non-light emitting, region 60 is disposed so as to face a vehicle side surface side with respect to the second light emitting region 50 on a vehicle front surface side. Although the bent portion 65 is a portion determined by the shape of a mold at the time of molding the cowl 101, for example, the cowl 101 may be formed of a plurality of members, and the bent portion 65 may be formed as a joint portion (edge portion) between the plurality of members.

The decorative lamp region 45 of the first light emitting region 40 and the second light emitting region 50 include a plurality of light emitting segments 31 disposed at predetermined intervals on a surface of the cowl 101. Each of the light emitting segments 31 is formed in, for example, a hexagonal shape.

The plurality of light emitting segments 31 have different sizes depending on arrangement locations. For example, as shown in FIG. 4, among the plurality of light emitting segments 31 of the decorative lamp region 45, the light emitting segment 31 on the vehicle front side is configured such that the size thereof is larger than the size of the light emitting segment 31 on the vehicle rear side. Further, among the plurality of light emitting segments 31 of the decorative lamp region 45, the light emitting segment 31 on a vehicle upper side is configured such that the size thereof is, larger than the size of the light emitting segment 31 on a vehicle lower side.

As shown in FIG. 5, among the plurality of light emitting segments 31 of the second light emitting region 50, the light emitting segment 31 on a central side is configured such that the size thereof is larger than the size of the light emitting segments 31 at both end sides. Accordingly, a front surface portion of the cowl 101 having a planar shape can be made to look like a curved surface shape surface, and a design property can be unproved.

Figure 6:
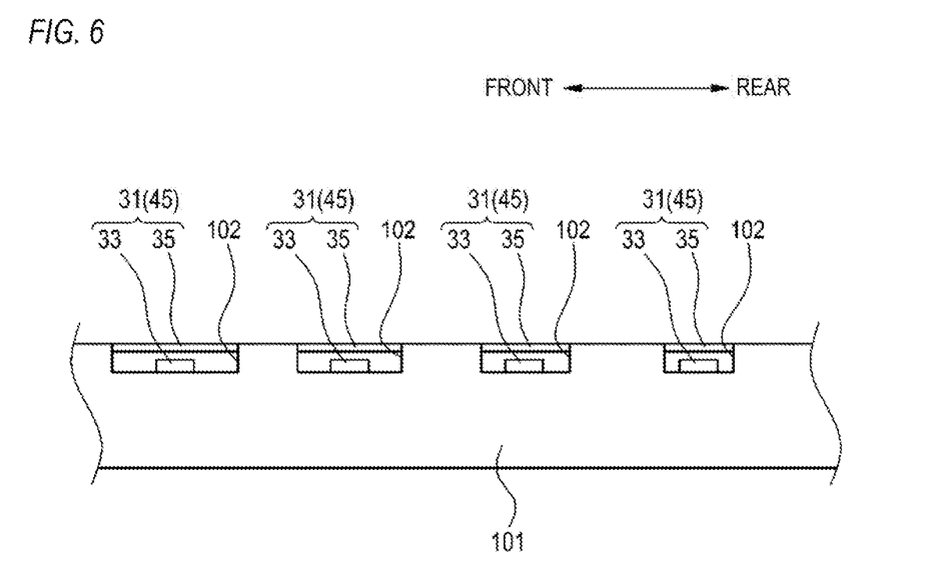
FIG. 6 is a cross-sectional view showing a schematic configuration of a decorative lamp of a combination lamp provided in the vehicle lamp.

FIG. 6 is a cross-sectional view showing a schematic configuration of the plurality of light emitting segments 31. As shown in FIG. 6, each of the plurality of light emitting segments 31 includes a light source 33 and a film 35 tan example of a cover member). Each light source 33 is disposed in each of a plurality of recessed portions 102 formed in the cowl 101. Examples of the light source 33 include a light emitting diode, a laser diode, an organic EL element and the like.

Each film 35 is attached to each concave portion 102 so as to cover an upper surface of each light source 33, and transmits light from each light source 33. That is, each light emitting segment 31 is formed by accommodating each light source 33 in a lamp chamber formed by each recessed portion 102 and each film 35. The film 35 is formed of a material which transmits light from the light source 33 and is visible in a color similar to that of the cowl 101 when the light source 33 is not turned on. For example, when the cowl 101 is silver, the film 35 may also be formed of a material which is visible in the same silver color as that of the cowl 101 when the light source 33 is not turned on, and is visible in a light color (for example, white) emitted from the light source 33 when the light source 33 is turned on.

As shown in FIG. 6, by making the size of the recessed portion 102 and the size of the film 35 provided so as to cover the recessed portion 102 different depending on a location where the recess 102 is formed, the size of the plurality of light emitting segments 31 can be changed. For example, FIG. 6 illustrates an example of the decorative lamp region 45 configured to decrease the size of the recessed portions 102 and the size of the films 35 from the front of the vehicle toward the rear of the vehicle.

In this example, the plurality of recessed portion 102 are formed on the surface of the cowl 101, and one light source 33 is accommodated in each recessed portion 102, but the present invention is not limited thereto. For example, a transparent flexible printed circuit board (FPC) including a plurality of light sources arranged at predetermined intervals may be mounted on the surface of the cowl 101, and a surface of the transparent FPC may be covered with a cover member which transmits light from the light source of the transparent FPC and is visible in a color similar to that of the cowl 101 when the light source is not turned on.

The illumination control unit 5 is configured to change illumination states of the combination lamp 3 and the road surface drawing lamp 4 according to a state of the motorcycle 100. For example, the illumination control unit 5 may be configured to turn on at least a part of the plurality of light emitting segments 31 constituting the decorative lamp region 45 and the second light emitting region 50 of the combination lamp 3 simultaneously with a timing of turning on the headlamp 2 or in conjunction with the timing of turning on the headlamp 2. The illumination control unit 5 may be configured to turn on at least a part of the plurality of light emitting segments 31 according to the environmental information acquired by the external sensor 7. The illumination control unit 5 may be configured to turn on at least a part of the plurality of light emitting segments 31 when a speed detected by the speed sensor 8 exceeds a certain threshold or when the speed is lower than a certain threshold. The illumination control unit 5 may be configured to form the road surface drawing pattern on the road surface by the road surface drawing lamp 4 simultaneously with a timing of turning on the combination lamp 3 or in conjunction with the timing of turning on the combination lamp 3.

The illumination controlling unit 5 may be configured to turn on any one of the lower parts 41B of the left and right marker lamp regions 41 functioning as a turn signal lamp based on a direction indication input by the driver. The illumination control unit 5 may be configured to turn on the upper parts 41A of the marker lamp regions 41 and the decorative lamp regions 45 functioning as clearance lamps based on an instruction input by the driver, a brightness around the motorcycle 100, or a state of the motorcycle 100, and the like.

Next, an example of turning-on control processing of the combination lamp 3 and the road surface drawing lamp 4 according to the present embodiment will be described with reference to FIGS. 7 and 8.

First, the illumination control unit 5 receives a detection signal from the external sensor 7 and acquires environmental information around the motorcycle 100 (step S10).

Next, the illumination control unit 5 determines whether the density of objects present in a detection range of the external sensor 7 exceeds a predetermined threshold based on the acquired environmental information (step S12). The density of the objects present in the detection range of the external sensor 7 indicates a degree of crowding of the objects. Examples of the object include, for example, moving objects such as other vehicles V1 to V3 and pedestrians shown in FIG. 8. The objects may include a structure such as a building or a utility pole, a tree, and the like.

In step S12, when it is determined that the density of the objects existing within the detection range of the external sensor 7 has exceeded a certain threshold (Yes in step S12), the illumination control unit 5 turns on the plurality of light emitting segments 31 constituting the decorative lamp region 45 and the second light emitting region 50 of the combination lamp 3 and the road surface drawing lamp 4 (step S14). Accordingly, the decorative lamp region 45 on both side surfaces of the motorcycle 100 and the second light emitting region 50 on the front surface emit light, and the guide lines L are emitted onto the road surface in front of the motorcycle 100 (see FIG. 8).

Next, based on the environmental information acquired in step S10, the illumination control unit 5 determines whether the distance between the object closest to the motorcycle 100 among the objects present in the detection range of the external sensor 7 (for example, the truck V1 in FIG. 8) and the motorcycle 100 that is the own vehicle is equal to or less than a predetermined distance (step S16). When it is determined in step S16 that the distance between the motorcycle 100 and the closest object V1 is equal to or less than the predetermined distance (Yes in step S16), the illumination control unit 5 changes light emission pattern of the decorative lamp region 45 and the second light emitting region 50 of the combination lamp 3 (step S18).

In step S18, for example, the illumination control unit 5 preferably causes the decorative lamp region 45 and the second light emitting region 50 to blink light emissions. Further, the illumination control unit 5 may cause the decorative lamp region 45 and the second light emitting region 50 to emit light in a stepwise manner (sequentially emit light). Further, the illumination control unit 5 may change the light emission pattern of the guide lines L formed on the road surface by the road surface drawing lamp 4.

Next, the illumination control unit 5 determines whether the density of the objects present in the detection range of the external sensor 7 is equal to or less than the predetermined threshold (step S20). When it is determined in step S20 that the density of the objects present in the detection range of the external sensor 7 is equal to or less than the predetermined threshold (Yes in step S20), the illumination control unit 5 turns off the plurality of light emitting segments 31 and the road surface drawing lamp 4 that are turned on (step S22). Thereafter, the illumination control unit 5 returns the processing to step S12.

As described above, the vehicle lamp 1 according to the present embodiment includes the headlamp 2 and the combination lamp 3, the combination lamp 3 includes the plurality of light emitting segments 31, and the plurality of light emitting segments 31 have different sizes depending on the arrangement locations. According to this configuration, the visibility of the own vehicle (motorcycle 100) can be enhanced. In particular, by turning on the decorative lamp region 45 and the second light emitting region 50 of the combination lamp 3 having different sizes of the light emitting segments 31 depending on the arrangement locations, the other vehicle (for example, the vehicle V3 shown in FIG. 8) or the pedestrian can easily recognize a direction of the motorcycle 100.

In the above embodiment, among the plurality of light emitting segments 31 of the decorative lamp region 45, the size of the light emitting segments 31 on the vehicle front side is configured to be larger than the size of the light emitting segments 31 on the vehicle rear side, and among the plurality of light emitting segments 31 of the second light emitting region 50, the size of the light emitting segments 31 on the central side is configured to be larger than the size of the light emitting segments 31 at both end sides, but the present embodiment is not limited to this example. For example, the size of the plurality of light emitting segments 31 constituting the second light emitting region 50 provided on the front surface side of the vehicle may be configured to be larger than the size of the plurality of light emitting segments 31 constituting the decorative lamp region 45 provided on both side surface sides of the vehicle.

Further, in the above embodiment, the configuration in which the light emitting segments 31 have different sizes depending on the arrangement locations is adopted, but the present invention is not limited to this example. At least one of the shapes, the light colors emitted from the light emitting segments 31, and the distance between the light emitting segments 31 may be different depending on the arrangement locations.

For example, the distance between the plurality of light emitting segments 31 of the second light emitting region 50 may be configured to be shorter than the distance between the plurality of light emitting segments 31 of the decorative lamp region 45. Further, among the plurality of light emitting segments 31 of the decorative lamp region 45, the distance between the light emitting segments 31 on the vehicle front side may be configured to be shorter than the distance between the light emitting segments 31 on the vehicle rear side. Further, among the plurality of light emitting segments 31 in the second light emitting region 50, the distance between the light emitting segments 31 on the central side may be configured to be shorter than the distance between the light emitting segments 31 on the both end sides. By employing these configurations, the direction of the motorcycle 100 can be easily recognized by the other vehicle or the pedestrian, and the design property of the combination lamp 3 can be improved.

In addition, for example, one of the decorative lamp region 45 and the second light emitting region 50 configured with the hexagonal light emitting segments 31 may be formed of a light emitting segment having a shape different from the hexagonal shape (a polygonal shape other than a hexagonal shape, a circular shape, and the like). Further, the light colors emitted from each light emitting segment 31 of the decorative lamp region 45 and each light emitting segment 31 of the second light emitting region 50 may be different. By employing these configurations, the direction of the motorcycle 100 can be easily recognized by the other vehicle or the pedestrian, and the design property of the combination lamp 3 can be improved.

Further, the first light emitting region 40 according to the present embodiment functions as a turn signal lamp, a daytime running lamp, a clearance lamp, or a decorative lamp which emits decorative light, and the second light emitting region 50 according to the present embodiment functions as a decorative lamp. According to this configuration, the novel combination lamp 3 having a high design property can be provided.

The first light emitting region 40 includes a marker lamp region 41 (third light emitting region) and a decorative lamp region 45 (fourth light emitting region) which is disposed on the vehicle rear side than the marker lamp region 41, and the marker light region 41 and the decorative lamp region 45 can emit light in different colors. In this way, by making light colors emitted from the marker lamp region 41 and the decorative lamp region 45 different, various functions as the combination lamp 3 can be exhibited.

The combination lamp 3 in the vehicle lamp 1 according to the present embodiment includes the first light emitting region 40 disposed on the vehicle side surface side, and the second light emitting region 50 disposed on the vehicle front surface side, and the non-light emitting region 60 is provided between the first light emitting region 40 and the second light emitting region 50. According to this configuration, by turning on the combination lamp 3 provided in the non-light emitting region 60, the shape of the non-light emitting region 60 appears different when the traveling direction of the motorcycle 100 is changed. In particular, since the non-light emitting region 60 is disposed at a corner between the first light emitting region 40 on the vehicle side surface side and the second light emitting region 50 on the vehicle front surface side, the shape of the non-light emitting region 60 to be visually recognized easily changes according to the change in the traveling direction of the motorcycle 100. Therefore, the other vehicle or the pedestrian can easily recognize the direction of the motorcycle 100.

The combination lamp 3 includes the bent portion 65 between the second light emitting region 50 and the non-light emitting region 60. Therefore, since the shape of the non-light emitting region 60 to be visually recognized easily changes according to the change in the traveling direction of the motorcycle 100, the other vehicle or the pedestrian can more easily recognize the direction of the motorcycle 100.

The first light emitting regions 40 are formed so as to extend in the upper-lower direction on both sides of the front wheel 105 of the motorcycle 100, and the second light emitting region 50 is disposed above the front wheel 105. According to this configuration, the light emitting portion including the first light emitting regions 40 and the second light emitting region 50 is formed in a vertically long downward U-shape when viewed from the front of the motorcycle 100. Accordingly, the other vehicle and the pedestrian can easily recognize that the vehicle on which the vehicle lamp 1 is mounted is a motorcycle, and recognize the direction of the motorcycle 100.

The plurality of light emitting segments 31 may be disposed only on both side surface sides of the cowl 101. That is, the combination lamp 3 may be configured as a decorative lamp including only the first light emitting regions 40 formed so as to extend in the upper-lower direction on both sides of the front wheel 105. In this case, since the first light emitting regions 40 are formed as two vertically long lines when viewed from the front of the motorcycle 100, the other vehicle or the pedestrian can easily recognize that the own vehicle is a motorcycle.

The vehicle lamp 1 according to the present embodiment further includes the illumination control unit 5 configured to change the illumination states of the combination lamp 3 and the road surface drawing lamp 4 according to the traveling state of the motorcycle 100, and the illumination control unit 5 is configured to change the illumination states of the plurality of light emitting segments constituting the combination lamp 3 and the road surface drawing lamp 4. According to this configuration, the visibility of the motorcycle 100 (particularly, the direction of the motorcycle 100) can be further enhanced by changing the light emission pattern of the plurality of light emitting segments 31 and the road surface drawing pattern (for example, the guide line L) formed by the road surface drawing lamp 4 in various manners.

The vehicle lamp 1 according to the present embodiment includes the external sensor 7 (environmental information acquisition unit) which acquires the environmental information outside the motorcycle 100, and the illumination control unit 5 is configured to change the illumination state of the combination lamp 3 according to the environmental information acquired by the external sensor 7. In this way, it is possible to effectively notify surroundings of the presence of the motorcycle 100 by changing the illumination state of the combination lamp 3 according to the environmental information.

For example, the environmental information preferably includes information on the density of the object present around the motorcycle 100 and the distance between the motorcycle 100 and the object. When there are many objects such as another vehicle and a pedestrian around the motorcycle 100, or when another vehicle or a pedestrian is present beside the motorcycle 100, the visibility of the motorcycle 100 can be enhanced, and the surroundings can be notified of the presence of the motorcycle 100 by changing the illumination state of the combination lamp 3. On the other hand, when the number of the objects around the motorcycle 100 decreases, since the necessity of notifying the surroundings of the presence of the motorcycle 100 decreases, it is preferable to turn off the combination lamp 3 (the decorative lamp region 45 and the second light emitting region 50).

Figure 7:
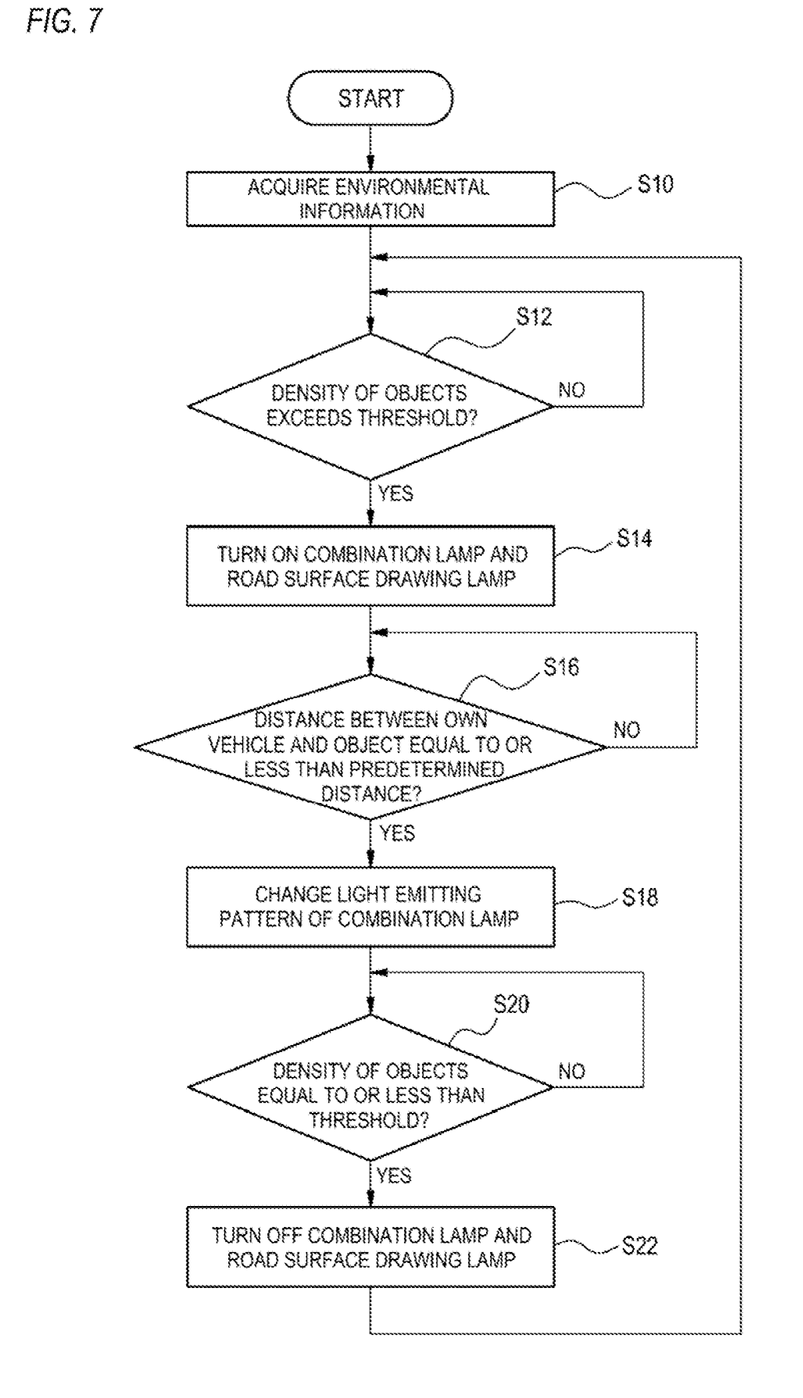
FIG. 7 is a flowchart showing an example of lighting control of the combination lamp and a road surface drawing lamp.

In the above embodiment, as shown in FIG. 7, the illumination control unit 5 controls turning on and off of the combination lamp 3 and the road surface drawing lamp 4 according to the density of the objects present within the detection range of the external sensor 7, but the present invention is not limited to this example. For example, the illumination control unit 5 may control the turning on and off of the combination lamp 3 and the road surface drawing lamp 4 based on the distance between the motorcycle 100 and the object closest to the motorcycle 100.

The environmental information may include information on a road condition. For example, when the motorcycle 100 reaches a place with many blind spots (such as an intersection shown in FIG. 8), the surroundings can be notified of the presence of the motorcycle 100 by changing the illumination state of the combination lamp 3 (for example, turning on the decorative lamp region 45 and the second light emitting region 50).

The illumination control unit 5 is configured to switch between turning on and off the combination lamp 3 and change the light emission pattern of the combination lamp 3 according to the environmental information. In this way, by changing the illumination mode of the combination lamp 3 for making a notification of the presence of the motorcycle 100 according to the environmental information, the visibility of the motorcycle 100 can be further enhanced.

In the above embodiment, the environmental information is acquired by the external sensor 7 configured with at least one of LiDAR, a camera, a radar, and the like, but the present invention is not limited to this example. For example, the environmental information may be acquired using road-to-vehicle communication with a base station device or inter-vehicle communication with an onboard device of another vehicle. The environmental information may be acquired by combining the detection signal from the external sensor 7 with the road-to-vehicle communication or the inter-vehicle communication. As described above, various kinds of environmental information can be acquired by using the road-to-vehicle communication or the inter-vehicle communication.

An order of the processing defined in the steps shown in FIG. 7 is merely an example, and the order of these steps can be changed as appropriate.

Although the embodiments of the present invention have been described above, it is needless to say that the technical scope of the present invention should not limitedly interpreted by the description of the present embodiments. The present embodiments are merely examples and it is to be understood by those skilled in the art that various modifications of the embodiments can be made within the scope of the invention described in the claims. The technical scope of the present invention should be determined based on the scope of the invention described in the claims and the scope of equivalents thereof.

In the above embodiment, the combination lamp 3 includes the plurality of light emitting segments 31, but is not limited to thereto. For example, the combination lamp 3 may include a surface light emitting unit which emits light over a certain region of the cowl 101. For example, the surface light emitting unit may include an organic EL element such as an organic light emitting diode (OLED) or a light emitting polymer.

The subject application is based on a Japanese Patent Application Publication No. 2017-204720 filed on Oct. 23, 2017, a Japanese Patent Application Publication No. 2017-204721 filed on Oct. 23, 2017, a Japanese Patent Application Publication No. 2017-204722 filed on Oct. 23, 2017, and a Japanese Patent Application Publication No. 2017-204722 filed on Oct. 23, 2017, the contents of which are incorporated herein by reference.

The invention claimed is:

1. A vehicle lamp provided in a vehicle capable of traveling around a corner by inclining a vehicle body in a turning direction, the vehicle lamp comprising:
    a headlamp mounted on a front portion of the vehicle; and
    a combination lamp disposed on a vehicle body cover in a region adjacent to the headlamp so as to be visible from a front of the vehicle,
    wherein the combination lamp includes a plurality of light emitting segments, and
    wherein the plurality of light emitting segments differ in at least one of a shape of, a size of, a color of, and a distance between the light emitting segments depending on arrangement locations;
    wherein the combination lamp includes a first light emitting region provided on a vehicle side surface side and a second light emitting region provided on a vehicle front surface side, and
    wherein at least one of a shape of, a size of, a color of, and a distance between light emitting segments of a plurality of light emitting segments constituting the first light emitting region is different from that of a plurality of light emitting segments constituting the second light emitting region;
    each of the first light emitting region and the second light emitting region including the plurality of light emitting segments arranged in rows and columns, each of the rows and each of the columns comprising at least two of the plurality of light emitting segments.

2. The vehicle lamp according to claim 1,
    wherein the size of the plurality of light emitting segments in the second light emitting region is configured to be larger than the size of the plurality of light emitting segments in the first light emitting region.

3. The vehicle lamp according to claim 1,
    wherein the distance between the plurality of light emitting segments in the second light emitting region is configured to be shorter than the distance between the plurality of light emitting segments in the first light emitting region.

4. The vehicle lamp according to claim 1,
    wherein the plurality of light emitting segments in the second light emitting region are configured such that the size of light emitting segments on a central side is larger than the size of light emitting segments on both end sides.

5. The vehicle lamp according to claim 1,
    wherein the plurality of light emitting segments in the second light emitting region are configured such that a distance between the light emitting segments on the central side is shorter than a distance between the light emitting segments on the both end sides.

6. The vehicle lamp according to claim 1,
    wherein the plurality of light emitting segments in the first light emitting region are configured such that the size of light emitting segments toward a vehicle front side is larger than the size of light emitting segments toward a vehicle rear side.

7. The vehicle lamp according to claim 1,
    wherein the plurality of light emitting segments in the first light emitting region are configured such that a distance between the light emitting segments toward the vehicle front side is shorter than a distance between the light emitting segments toward the vehicle rear side.

8. A vehicle lamp provided in a vehicle capable of traveling around a corner by inclining a vehicle body in a turning direction, the vehicle lamp comprising:
    a headlamp mounted on a front portion of the vehicle; and
    a combination lamp disposed on a vehicle body cover in a region adjacent to the headlamp so as to be visible from a front of the vehicle,
    wherein the combination lamp includes a first light emitting region, and
    wherein the first light emitting region is formed such that at least a part thereof extends in an upper-lower direction on both sides of a front wheel of the vehicle, and the at least part of the first light emitting region extends to a same vertical height as the front wheel of the vehicle;

wherein the combination lamp further includes a second light emitting region;

each of the first light emitting region and the second light emitting region including the plurality of light emitting segments arranged in rows and columns, each of the rows and each of the columns comprising at least two of the plurality of light emitting segments.

9. The vehicle lamp according to claim 8,
wherein the first light emitting region is disposed on two side surface sides of the vehicle, and
wherein the second light emitting region is disposed on a front surface side of the vehicle and above the front wheel.

10. The vehicle lamp according to claim 9,
wherein a non-light emitting region is provided between the first light emitting region and the second light emitting region.

11. The vehicle lamp according to claim 8,
wherein the first light emitting region includes a third light emitting region, and a fourth light emitting region disposed on a vehicle rear side than the third light emitting region, and
wherein the third light emitting region and the fourth light emitting region are capable of emitting light of different colors.

12. The vehicle lamp according to claim 11, further comprising:
an illumination control unit configured to change an illumination state of the combination lamp according to a traveling state of the vehicle,
wherein the second light emitting region and the fourth light emitting region each have a plurality of light emitting segments, and
wherein the illumination control unit is configured to change an illumination state of each of the plurality of light emitting segments.

13. The vehicle lamp according to claim 11,
wherein the third light emitting region functions as a turn signal lamp, a daytime running lamp, or a clearance lamp,
wherein the fourth light emitting region may function as a turn signal lamp or a decorative lamp which emits decorative light, and
wherein the second light emitting region functions as the decorative lamp.

14. A vehicle lamp provided in a vehicle capable of traveling around a corner by inclining a vehicle body in a turning direction, the vehicle lamp comprising:
a headlamp mounted on a front portion of the vehicle;
a combination lamp disposed on a vehicle body cover in a region adjacent to the headlamp so as to be visible from a front of the vehicle;
an environmental information acquisition unit configured to acquire environmental information outside the vehicle; and
an illumination control unit configured to change an illumination state of the combination lamp according to the acquired environmental information;
wherein the combination lamp includes a first light emitting region provided on a vehicle side surface side and a second light emitting region provided on a vehicle front surface side, and
each of the first light emitting region and the second light emitting region including the plurality of light emitting segments arranged in rows and columns, each of the rows and each of the columns comprising at least two of the plurality of light emitting segments.

15. The vehicle lamp according to claim 14,
wherein the environmental information includes information on at least one of a distance between the vehicle and an object, a density of the object, and a road condition.

16. The vehicle lamp according to claim 14,
wherein the illumination control unit is configured to switch between turning on and off the combination lamp or change a light emission pattern of the combination lamp according to the environmental information.

17. The vehicle lamp according to claim 14,
wherein the environmental information acquisition unit includes a sensor mounted on the vehicle, and
wherein the sensor is at least one of LiDAR, a camera, and a radar.

18. The vehicle lamp according to claim 14,
wherein the environmental information acquisition unit is capable of acquiring the environmental information using road-to-vehicle communication with a base station device or inter-vehicle communication with an onboard device of a vehicle different from the vehicle.

19. The vehicle lamp according to claim 14, further comprising:
a road surface drawing lamp capable of forming a road surface drawing pattern on a road surface,
wherein the illumination control unit is configured to adjust an illumination state of the road surface drawing pattern according to the environmental information.

20. The vehicle lamp according to claim 14,
wherein the first light emitting region is formed such that at least a part thereof extends in an upper-lower direction on both sides of a front wheel of the vehicle, and the at least part of the first light emitting region extends to a same vertical height as the front wheel of the vehicle.

* * * * *